(12) United States Patent
 Min (10) Patent No.: US 12,343,598 B1
(45) Date of Patent: Jul. 1, 2025

(54) CHARGING COMPLETE DEVICE FOR HOLLOW SPHERE

(71) Applicant: JIANGYIN MINGDE SPORTS GOODS CO., LTD, Jiangyin (CN)

(72) Inventor: Sangqing Min, Jiangyin (CN)

(73) Assignee: JIANGYIN MINGDE SPORTS GOODS CO., LTD, Jiangyin (CN)

( * ) Notice: Subject to any disclaimer, the term of this patent is extended or adjusted under 35 U.S.C. 154(b) by 0 days.

(21) Appl. No.: 19/000,329

(22) Filed: Dec. 23, 2024

(30) Foreign Application Priority Data

Nov. 28, 2024 (CN) .......................... 2024229127669

(51) Int. Cl.
 *A63B 41/02* (2006.01)
(52) U.S. Cl.
 CPC .......... *A63B 41/02* (2013.01); *A63B 2225/62* (2013.01)
(58) Field of Classification Search
 CPC ..... A63B 41/02; A63B 2225/62; A63B 43/06; A63B 2225/74
 USPC ....................................................... 137/223
 See application file for complete search history.

(56) References Cited

U.S. PATENT DOCUMENTS

| | | | | |
|---|---|---|---|---|
| 5,102,131 A * | 4/1992 | Remington | ............ | A63B 43/06 446/438 |
| 7,014,581 B2 * | 3/2006 | Ng | ...................... | A63B 43/004 473/570 |
| 9,517,389 B2 * | 12/2016 | Won | ........................ | A63B 43/06 |
| 10,076,685 B2 * | 9/2018 | King | ........................ | H02J 50/90 |
| 10,434,376 B2 * | 10/2019 | Larson | .................... | A63B 41/00 |
| 12,102,885 B2 * | 10/2024 | Husemeyer | ............ | A63B 41/04 |
| 12,145,028 B2 * | 11/2024 | Liang | .................... | H02J 7/0042 |
| 12,220,617 B1 * | 2/2025 | Wang | .................... | F21V 33/008 |

FOREIGN PATENT DOCUMENTS

| | | |
|---|---|---|
| CN | 203504262 U | 3/2014 |
| CN | 106761942 A | 5/2017 |
| CN | 206346782 U | 7/2017 |

\* cited by examiner

*Primary Examiner* — Craig M Schneider
*Assistant Examiner* — Andrew J Rost
(74) *Attorney, Agent, or Firm* — Nitin Kaushik (57) ABSTRACT

A charging complete device for a hollow sphere is provided. The hollow sphere is internally provided with a bladder accommodating gas, and the device includes a gas nozzle configured for charging and a charger. The gas nozzle includes a rubber cushion, a gas nozzle channel, a positive spring plate, and a negative spring plate, the gas nozzle channel is fixed to the rubber cushion, and an outlet of the gas nozzle channel is located in the bladder. The positive spring plate and the negative spring plate are located on an inner side of the gas nozzle channel in sequence. The charger includes a needle-shaped charging head, and a length of the needle-shaped charging head is at least two centimeters. The present invention has the following advantages: 1. simplifying manufacturing. 2. improving use convenience. 3. improving an appearance. 4. guaranteeing performance and ensuring overall sealing and durability of the hollow sphere.

11 Claims, 7 Drawing Sheets

CHARGING COMPLETE DEVICE FOR HOLLOW SPHERE

CROSS-REFERENCE TO RELATED APPLICATIONS

The application claims priority to Chinese patent application No. 2024229127669, filed on Nov. 28, 2024, the entire contents of which are incorporated herein by reference.

TECHNICAL FIELD

The present invention relates to a charging complete device for a hollow sphere, and in particular, to a complete device including a hollow sphere and charging at an inflation opening and a charging opening of the hollow sphere.

BACKGROUND

In modern life, various hollow sphere products are widely applied to entertainment, decoration, and other fields. A traditional hollow sphere, such as a luminous charging sphere, often requires a separate charging interface, and the charging interface and an inflation opening are usually disposed separately.

This brings a series of problems. On the one hand, a plurality of interfaces are disposed to increase the manufacturing complexity and costs of the hollow sphere. During production, the charging interface and the inflation opening need to be designed and processed separately, which not only consumes more materials and man-hours, but also may affect the overall sealing and durability of the hollow sphere due to too many interfaces.

On the other hand, when using the traditional hollow sphere, a user needs to find corresponding interfaces in different positions, which is cumbersome to operate. When it is urgent to charge or inflate the luminous charging sphere, time may be wasted because the correct interface cannot be found, thereby reducing the use convenience. Especially in some specific occasions, such as outdoor activities and emergency lighting, it is particularly important to quickly find and use the appropriate interface for charging or inflation.

In addition, the plurality of interfaces may further affect the appearance design of the hollow sphere. In order to accommodate different interfaces, the surface of the hollow sphere may need to be provided with more bumps or recesses, thereby destroying the overall smoothness and aesthetics of the hollow sphere.

A search of the prior art reveals a Chinese patent entitled "NOVEL WIRED AND RECHARGEABLE BASKETBALL" with application No. 201610275089.1. In the patent, an outer surface of a cavity and a bladder form an airtight inflation chamber, and the cavity and the bladder are integrated, to ensure airtightness of the basketball. Therefore, inflation cannot be completed at the charging opening actually, and an additional inflation opening must be provided. Therefore, the problem of separate arrangement of the charging interface and the inflation opening in the prior art is not solved. A patent WO2019061645A1 entitled "SMART CHARGING STRUCTURE OF INFLATABLE SPHERE" with patent application No. 201610275089.1 is revealed. Although the inflation opening and the charging interface may be disposed at the same opening, the structure is very complex, the technical solution to be implemented is very complex, and the costs are high.

In conclusion, the existing hollow sphere charging and inflation manners are complex in manufacturing and inconvenient in use and affect the appearance. There is an urgent need for a charging complete device that can directly charge at the inflation opening of the hollow sphere, to simplify the design and use of the hollow sphere and improve the convenience and practicality of the hollow sphere.

SUMMARY

A purpose of the present invention is to design a charging complete device for a hollow sphere and a charging complete device that can directly charge at an inflation opening of the hollow sphere, to simplify design and use of the hollow sphere and improve convenience and practicability of the hollow sphere.

The present invention is implemented in the following manners:

A charging complete device for a hollow sphere is provided, where the hollow sphere is internally provided with a bladder accommodating gas, and the device includes a gas nozzle configured for charging and a charger; the gas nozzle includes a rubber cushion, a gas nozzle channel, a positive spring plate, and a negative spring plate, the gas nozzle channel is fixed to the rubber cushion, and an outlet of the gas nozzle channel is located in the bladder; the positive spring plate and the negative spring plate are located on an inner side of the gas nozzle channel in sequence; and the charger includes a needle-shaped charging head, and a length of the needle-shaped charging head is at least two centimeters. The "being located on an inner side of the gas nozzle channel in sequence" refers to being close to a position of a sphere center of the hollow sphere.

A length of a conventional needle-shaped charging head does not exceed one centimeter generally. However, in the patent, to adapt to a structure of the needle-shaped charging head, a longer length of the needle-shaped charging head is needed. The positive spring plate and the negative spring plate are in the gas nozzle channel in the hollow sphere, and these spring plates are charging contact points. To ensure that the needle-shaped charging head can be in contact with the spring plate stably, a sufficient length is needed. If the needle-shaped charging head is too short, the needle-shaped charging head may not be in contact with the spring plate accurately, and the contact may be interrupted especially in a case that a shape of internal space may change after the bladder is inflated, or the device slightly shakes. That the length is at least two centimeters may enable the charging head to be plugged in the gas nozzle channel with the sufficient length and to be in good contact with the spring plate under a certain degree of displacement.

As a further improvement, the gas nozzle further includes an enclosure and a charging chip, and the enclosure is fixed to the rubber cushion; the charging chip is fixed on the enclosure and is connected to the positive spring plate and the negative spring plate; and the enclosure and the bladder are communicated internally.

Differing from some structures that "the cavity and the bladder are integrated, to ensure airtightness of the sphere" in the prior art, a structure that the enclosure and the bladder are communicated internally is adopted, so that an inflation needle may be plugged in the charging opening for inflation, that is, the charging opening for plugging is also an inflation opening at the same time.

As a further improvement, the rubber cushion includes a rubber piece and a rubber head, and the rubber head is located on an inner side of the rubber piece. The rubber cushion is composed of the rubber piece and the rubber head, and the rubber head is located on an inner side of the rubber piece. This design increases sealing performance of the gas nozzle. When the inflation needle or the needle-shaped charging head is plugged or unplugged, the rubber head may better adapt to a shape change thereof, to fill a gap.

As a further improvement, the enclosure includes an upper edge and a peripheral wall, the upper edge is fixed between the rubber head and the rubber piece, and the rubber head is fastened between peripheral walls. The upper edge of the enclosure is fixed between the rubber head and the rubber piece, and this connection manner enables the enclosure to be closely combined with the rubber cushion. On one hand, stability of the entire gas nozzle structure is enhanced, and during use of the hollow sphere, even if the hollow sphere is hit or shaken by external force, a connection between the enclosure and the rubber cushion is not easy to loosen. On the other hand, the rubber head is fastened between the peripheral walls of the enclosure, further improving a sealing effect. This matched structural design between the enclosure and the rubber cushion ensures stability of the gas nozzle during long-term use, and the gas nozzle can be operated stably whether an inflation operation or a charging operation is performed.

As a further improvement, the charging chip is fixed between the peripheral walls. This mounting manner enables the charging chip to have a stable position in the enclosure. During daily use and charging of the hollow sphere, the charging chip does not displace due to shaking or other external factors, thereby ensuring a stable connection between the charging chip and the positive spring plate and the negative spring plate.

As a further improvement, the charging chip is provided with a hole allowing the needle-shaped charging head to pass through, and the positive spring plate and the negative spring plate are located on an inner side of the hole. This design provides an accurate plugging path for the charging head subtly. The positive spring plate and the negative spring plate are located on the inner side of the hole, and the needle-shaped charging head can be in contact with the spring plate accurately when plugged, to implement a charging function. The "being located on an inner side of the hole in sequence" refers to being close to a position of a sphere center of the hollow sphere.

As a further improvement, the device further includes a fixing bracket configured to fix the positive spring plate and the negative spring plate, and the fixing bracket is located on the inner side of the hole. The "being located on an inner side of the hole" refers to being close to a position of a sphere center of the hollow sphere.

Stability of the spring plate is further improved. During long-term use, the spring plate is not displaced or deformed due to a plurality of times of plugging and unplugging the charging head, thereby ensuring stability of a charging connection. In addition, the fixing bracket may enable the spring plate to be maintained at a proper position and angle and to be in good contact with the needle-shaped charging head, thereby improving charging efficiency and security.

As a further improvement, the enclosure is cylindrical, the rubber head is conical, and a conical side is located on an inner side of the hollow sphere. The conical rubber head can better encompass a plugged object after a plugging operation is completed, thereby further enhancing the sealing effect.

As a further improvement, a diameter of the needle-shaped charging head does not exceed a diameter of an inflation needle for inflating the hollow sphere.

The inflation needle for inflating the hollow sphere is designed to inject gas into the bladder. When a structure of the gas nozzle is designed, a size of an internal channel thereof (including the rubber cushion, the gas nozzle channel, and other parts) is adapted according to a size of the inflation needle, to ensure that inflation can be successfully performed. If the diameter of the needle-shaped charging head exceeds the diameter of the inflation needle, when the needle-shaped charging head is plugged in the gas nozzle channel, the gas nozzle channel may be stretched, resulting in deformation and damage of the gas nozzle.

As a further improvement, the needle-shaped charging head includes a central needle and a metal housing, an insulation layer is disposed between the central needle and the metal housing, and the central needle protrudes from an end portion of the charging head. The central needle protrudes from the end portion of the charging head. This design is conducive for the central needle to first be in contact with the positive spring plate or the negative spring plate in the gas nozzle. When the central needle is plugged in the gas nozzle for charging, since the central needle protrudes, the spring plate can be accurately positioned and contacted, thereby reducing a possibility of a charging failure caused by poor contact.

As a further improvement, the enclosure and the charging chip are made of a high-temperature resistant material or protected by using a heat-insulating material.

In production of the hollow sphere, vulcanization is a key step, which is crucial to improve performance of a rubber skin. Rubber vulcanization needs to be performed at a high temperature because a vulcanization reaction requires sufficient energy to activate a chemical reaction between rubber molecules and a vulcanizing agent. Generally, a vulcanization temperature may reach 140° C. to 180° C., and in some special vulcanization processes, the temperature may even be higher. When vulcanization is performed on a skin of the hollow sphere, if the enclosure and the charging chip do not have a high-temperature protection measure, a high temperature causes serious damage to the enclosure and the charging chip. For the charging chip, an integrated circuit in the charging chip is composed of various semiconductor materials and metal conducting wires. The high temperature changes performance of the semiconductor materials, for example, electronic mobility of a silicon-based semiconductor changes at the high temperature, resulting in invalidation of an electrical property of the chip. At the same time, the metal conducting wires in the chip may be expanded and oxidized and have other problems due to the high temperature, thereby resulting in breaking or short circuit of a line. If there is no high-temperature resistant or heat-insulating protection, the enclosure may be deformed at the high temperature, thereby affecting an ability of the enclosure to protect the internal charging chip and other components. In addition, deformation of the enclosure may loosen a connection with other components, thereby destroying structural integrity of the entire charging device. Since the high temperature during vulcanization, a sequence of mounting the enclosure and the charging chip in a skin on which vulcanization is not performed is a key to ensuring that the enclosure and the charging chip can be prevented from high-temperature damage in subsequent vulcanization production. Generally, the heat-insulating material needs to be able to withstand a high temperature of 200 degrees.

The present invention has the following advantages: 1. simplifying manufacturing: charging and inflation functions are integrated into one gas nozzle, to reduce a quantity of interfaces, reduce manufacturing complexity, and save production materials and man-hours. 2. improving use convenience: a user does not need to find charging and inflation interfaces in different positions, especially in outdoor activities, emergency lighting, and other scenarios, and the user can quickly charge at the inflation opening, which is simple to operate and saves time. 3. improving an appearance: bumps or recesses, caused by a plurality of interfaces, on the surface of the hollow sphere are avoided, and overall smoothness and aesthetics of the hollow sphere are maintained. 4. guaranteeing performance and ensuring overall sealing and durability of the hollow sphere. At the same time, the enclosure and the charging chip adopt the high-temperature resistant material or the heat-insulating protection, thereby ensuring a normal operation of a manufacturing process and improving use security and reliability.

Reference numerals in the drawings: 1. bladder; 2. gas nozzle; 21. rubber cushion; 211. rubber piece; 212. rubber head; 22. gas nozzle channel; 23. positive spring plate; 24. negative spring plate; 25. enclosure; 251. upper edge; 252. peripheral wall; 26. charging chip; 261. hole; 3. charger; 31. central needle; 32. metal housing; 33. insulation layer; 4. fixing bracket; 5. channel between interiors of the enclosure and the bladder.

DETAILED DESCRIPTION OF THE EMBODIMENTS

The present invention will be further explained below in combination with the accompanying drawings.

Figure 7:
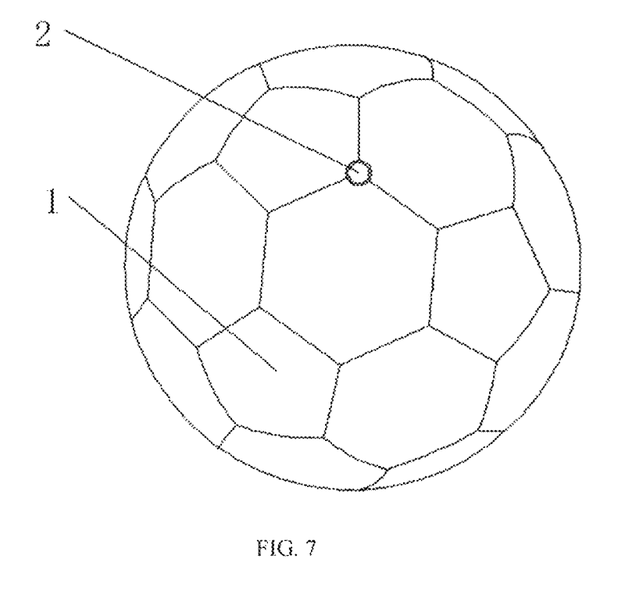
FIG. 7 is a structural diagram of a hollow sphere according to the present invention.

As shown in FIG. 7, a charging complete device for a hollow sphere includes a rechargeable gas nozzle 2 in the hollow sphere and a charger 3 matched with the gas nozzle. The hollow sphere is internally provided with a bladder 1 accommodating gas. As a key component, the gas nozzle 2 integrates charging and inflation functions.

Figure 1:
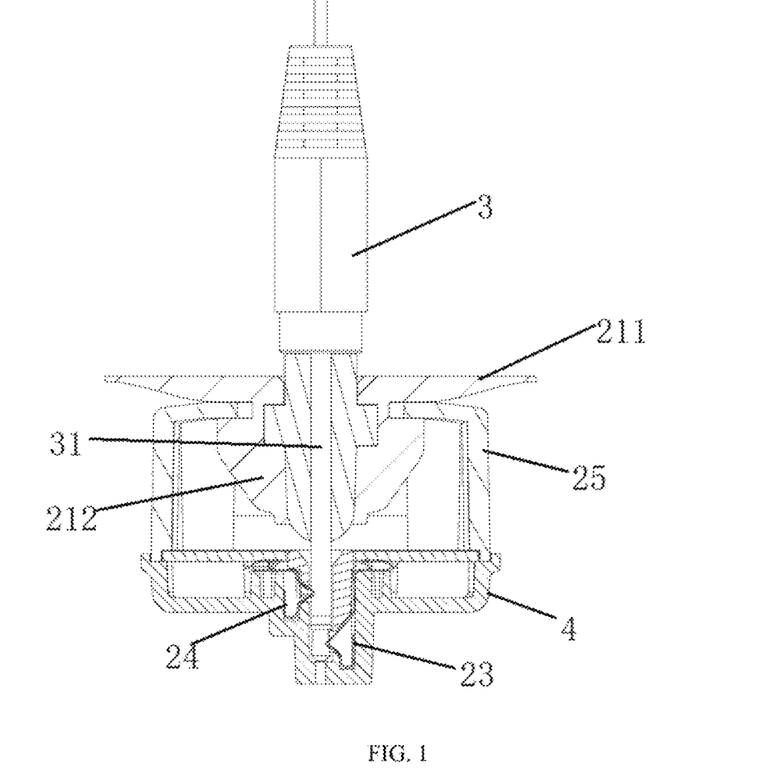
FIG. 1 is a structural diagram according to the present invention.
Figure 2:
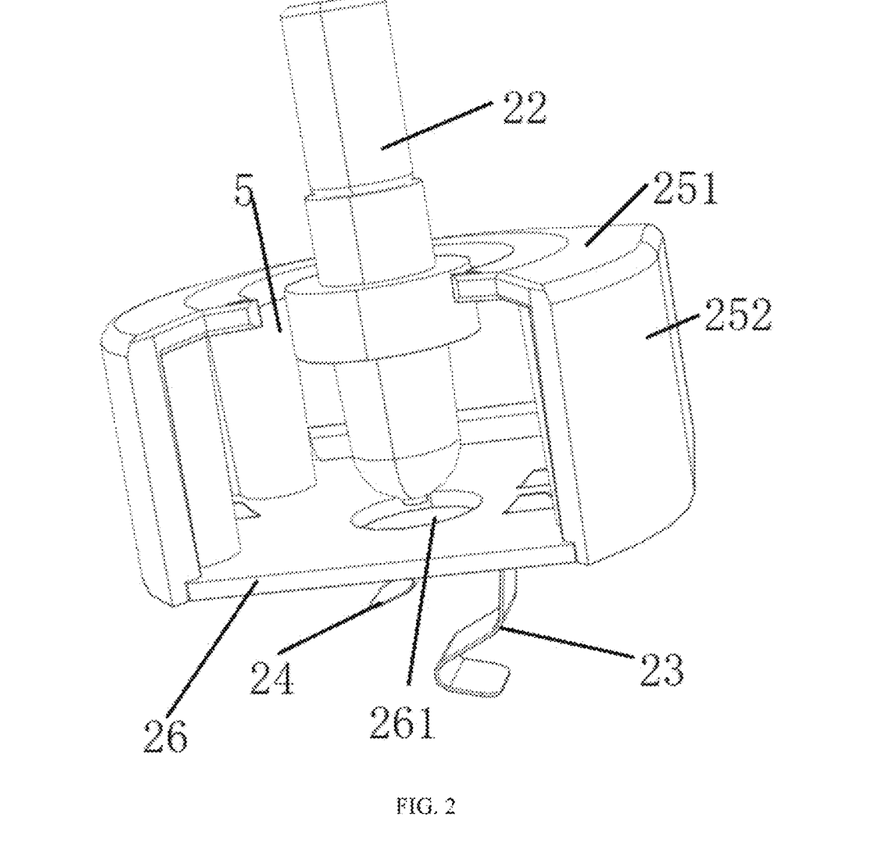
FIG. 2 is a three-dimensional diagram in which a charging head is plugged according to the present invention.
Figure 3:
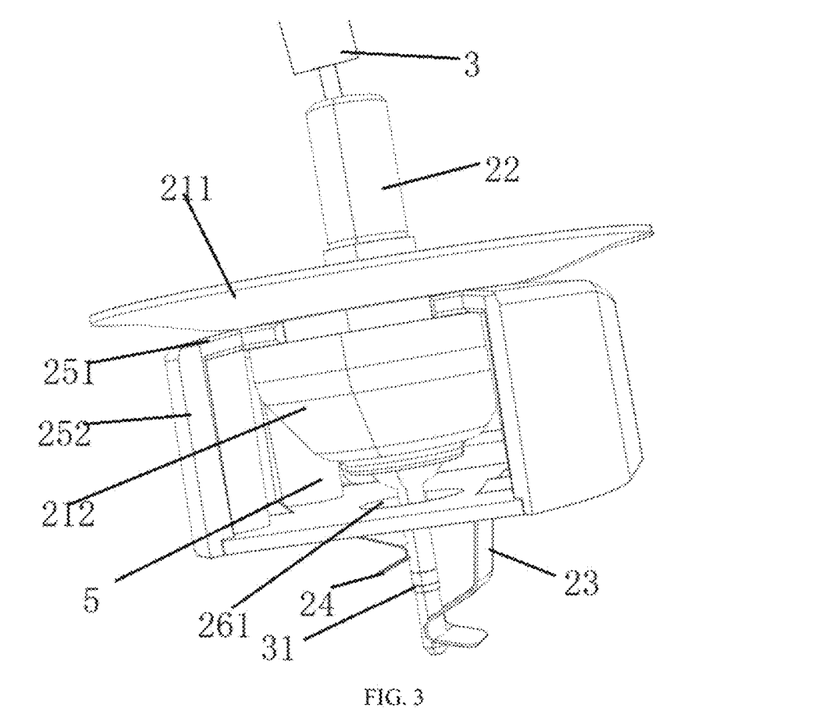
FIG. 3 is a three-dimensional diagram in which a charging head is not plugged according to the present invention.
Figure 6:
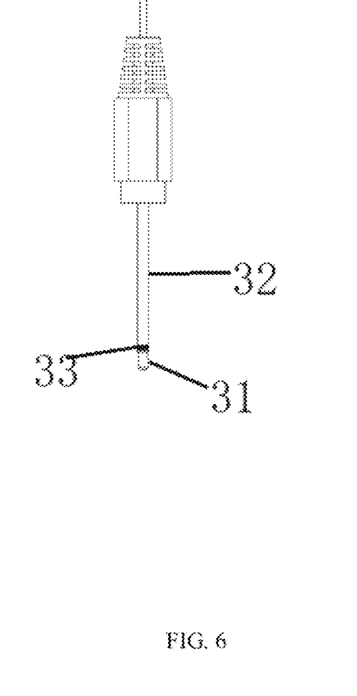
FIG. 6 is a structural diagram of a charging head according to the present invention.

As shown in FIG. 2, FIG. 3, and FIG. 6, a rubber cushion 21 is composed of a rubber piece 211 and a rubber head 212, and the rubber head 212 is located on an inner side of the rubber piece 211. The rubber head 212 is designed to be conical, and a conical side of the rubber head faces an inner side of the hollow sphere. When an inflation needle or a needle-shaped charging head is plugged or unplugged, the rubber head 212 that is conical may better adapt to a shape change, to fill a gap, thereby enhancing sealing performance of the gas nozzle 2.

A gas nozzle channel 22 is fixed to the rubber cushion 21, and an outlet of the gas nozzle channel is located in the bladder 1. A positive spring plate 23 and a negative spring plate 24 are located on an inner side of the gas nozzle channel 22 in sequence and are close to a position of a sphere center of the hollow sphere, which are contact points for charging.

Figure 4:
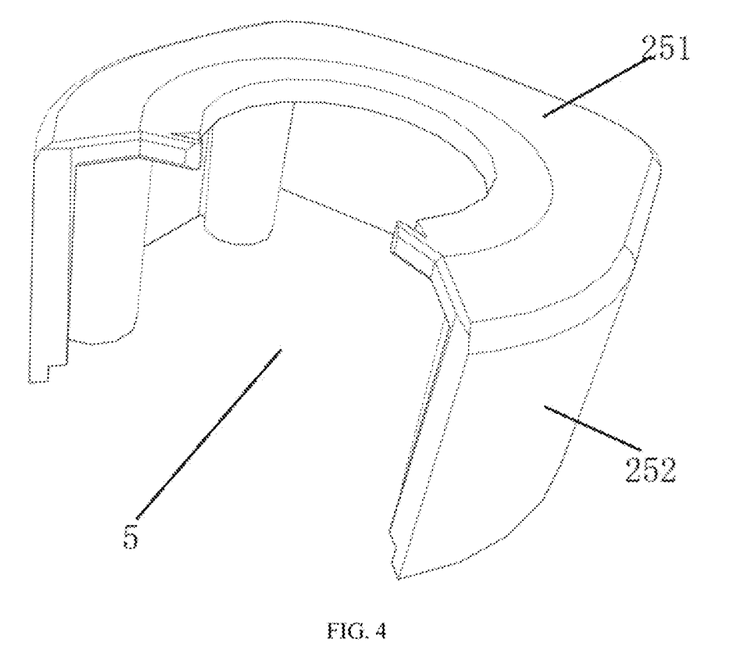
FIG. 4 is a structural diagram of an enclosure according to the present invention.
Figure 5:
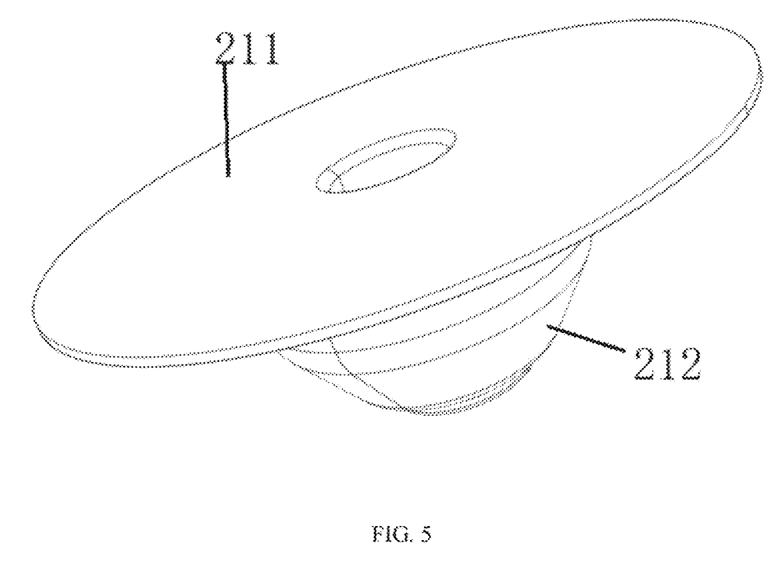
FIG. 5 is a structural diagram of a rubber cushion according to the present invention.

As shown in FIG. 2, FIG. 3, and FIG. 4, an enclosure 25 is cylindrical and includes an upper edge 251 and a peripheral wall 252. The enclosure is not integrally cylindrical, the peripheral wall 252 does not completely insulate the enclosure 25 from the interior of the bladder, and a channel 5 between the interiors of the enclosure and the bladder is to allow gas to pass through during inflation. The upper edge 251 is fixed between the rubber head 212 and the rubber piece 211, and the rubber head 212 is fastened between peripheral walls 252. This connection manner enables the enclosure 25 to be closely combined with the rubber cushion 21, thereby enhancing structural stability and sealing of the gas nozzle 2. Even if the hollow sphere is hit or shaken by external force, a connection between the enclosure 25 and the rubber cushion 21 is not easy to loosen.

A charging chip 26 is fixed between the peripheral walls 252 of the enclosure 25. A position of the charging chip is stable and is not displaced by the external force during daily use and charging of the hollow sphere. The charging chip 26 is provided with a hole 261 allowing the needle-shaped charging head to pass through. The positive spring plate 23 and the negative spring plate 24 are located on an inner side of the hole 261 and are close to the position of the sphere center of the hollow sphere, to provide an accurate plugging path for the charging head, thereby ensuring accurate contact between the charging head and the spring plate to implement a charging function.

The device further includes a fixing bracket 4 configured to fix the positive spring plate 23 and the negative spring plate 24, and the fixing bracket 4 is located on the inner side of the hole 261 and is close to the position of the sphere center of the hollow sphere. This improves stability of the spring plate. The spring plate is not displaced or deformed when the spring plate is used for a long term and the charging head is plugged and unplugged for a plurality of times, thereby ensuring reliability of a charging connection. At the same time, it is ensured that the spring plate is at a proper position and angle, which is conducive to good contact with the charging head and improves charging efficiency and security.

The needle-shaped charging head of the charger 3 is at least two centimeters long, which is different from a conventional needle-shaped charging head that is no longer than one centimeter. This design is to ensure that the charging head still can be in contact with the spring plate in the gas nozzle 2 stably when a shape of internal space changes after the bladder 1 of the hollow sphere is inflated or when the device slightly shakes. A diameter of the needle-shaped charging head does not exceed a diameter of the inflation needle for inflating the hollow sphere, to prevent the gas nozzle channel 22 from being stretched when the needle-shaped charging head is plugged in the gas nozzle channel 22 and to avoid deformation and damage of the gas nozzle 2.

As shown in FIG. 6, the needle-shaped charging head includes a central needle 31 and a metal housing 32. An insulation layer 33 is disposed between the central needle 31 and the metal housing 32, and the central needle 31 protrudes from an end portion of the charging head. According to this design, the central needle 31 can be in contact with the positive spring plate 23 or the negative spring plate 24 in the gas nozzle 2 first, and the spring plate may be accurately positioned and contacted when the central needle is plugged in the gas nozzle 2, thereby reducing a charging failure caused by poor contact.

In production of the hollow sphere, vulcanization of a rubber skin usually requires a high temperature, which is from 140° C. to 180° C. generally. The vulcanization is crucial for improving performance of the rubber skin, but the high temperature may damage the enclosure 25 and the charging chip 26.

The enclosure 25 and the charging chip 26 are made of a high-temperature resistant material or protected by using a heat-insulating material. The heat-insulating material needs to be able to withstand a high temperature of 200 degrees. For example, a ceramic material such as alumina ceramic and silicon nitride ceramic may be used as the material of the enclosure 25, which has a high melting point, moderate or low thermal conductivity, and good chemical stability. For the charging chip 26, this high-temperature protection measure may prevent performance of a semiconductor material in an integrated circuit in the charging chip from changing, for example, electronic mobility of a silicon-based semiconductor changes, and a metal conducting wire is expanded and oxidized, thereby avoiding breaking or short circuit of a line. At the same time, deformation or connection looseness of the enclosure 25 may be avoided, thereby ensuring structural integrity of the entire charging device.

What is claimed is:

1. A charging complete device for a hollow sphere, wherein the hollow sphere is internally provided with a bladder accommodating gas, and the device comprises a gas nozzle configured for charging and a charger;

the gas nozzle comprises a rubber cushion, a gas nozzle channel, a positive spring plate, and a negative spring plate, the gas nozzle channel is fixed to the rubber cushion, and an outlet of the gas nozzle channel is located in the bladder; and the positive spring plate and the negative spring plate are located on an inner side of the gas nozzle channel in sequence; and the charger comprises a needle-shaped charging head, and a length of the needle-shaped charging head is at least two centimeters.

2. The charging complete device for a hollow sphere according to claim 1, wherein the gas nozzle further comprises an enclosure and a charging chip, and the enclosure is fixed to the rubber cushion; the charging chip is fixed on the enclosure and is connected to the positive spring plate and the negative spring plate; and the enclosure and the bladder are communicated internally.

3. The charging complete device for a hollow sphere according to claim 2, wherein the rubber cushion comprises a rubber piece and a rubber head, and the rubber head is located on an inner side of the rubber piece.

4. The charging complete device for a hollow sphere according to claim 3, wherein the enclosure comprises an upper edge and a peripheral wall, the upper edge is fixed between the rubber head and the rubber piece, and the rubber head is fastened between peripheral walls.

5. The charging complete device for a hollow sphere according to claim 4, wherein the charging chip is fixed between the peripheral walls.

6. The charging complete device for a hollow sphere according to claim 5, wherein the charging chip is provided with a hole allowing the needle-shaped charging head to pass through, and the positive spring plate and the negative spring plate are located on an inner side of the hole.

7. The charging complete device for a hollow sphere according to claim 6, wherein the device further comprises a fixing bracket configured to fix the positive spring plate and the negative spring plate, and the fixing bracket is located on the inner side of the hole.

8. The charging complete device for a hollow sphere according to claim 4, wherein the enclosure is cylindrical, the rubber head is conical, and a conical side is located on an inner side of the hollow sphere.

9. The charging complete device for a hollow sphere according to claim 2, wherein the enclosure and the charging chip are made of a high-temperature resistant material or protected by using a heat-insulating material.

10. The charging complete device for a hollow sphere according to claim 1, wherein a diameter of the needle-shaped charging head does not exceed a diameter of an inflation needle for inflating the hollow sphere.

11. The charging complete device for a hollow sphere according to claim 1, wherein the needle-shaped charging head comprises a central needle and a metal housing, an insulation layer is disposed between the central needle and the metal housing, and the central needle protrudes from an end portion of the charging head.

\* \* \* \* \*